May 18, 1948.  J. R. HICKS  2,441,882
SEAL FOR DIFFERENTIAL PRESSURE APPARATUS
Filed April 20, 1943
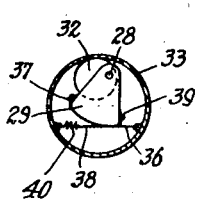
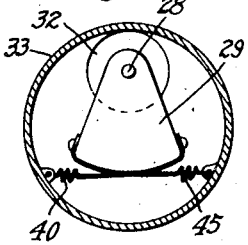
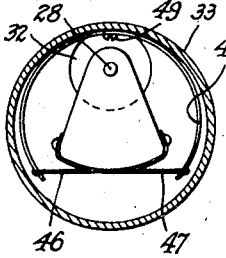
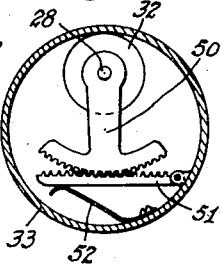
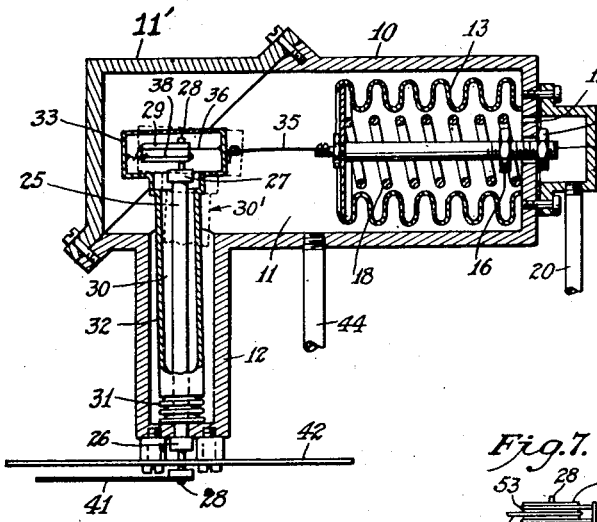
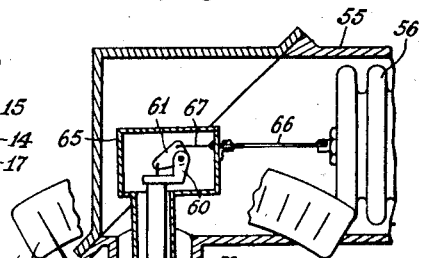
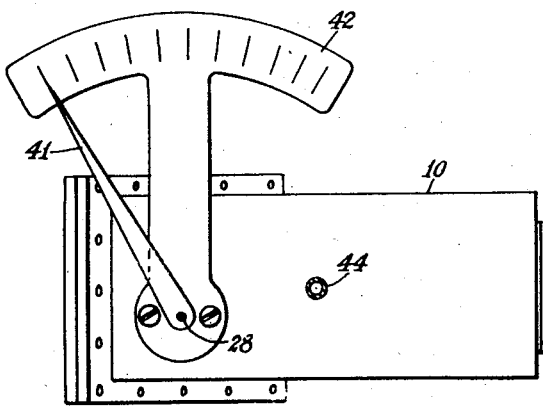
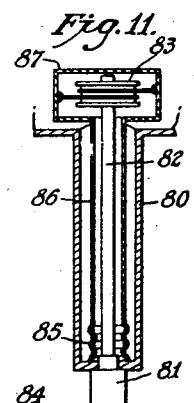
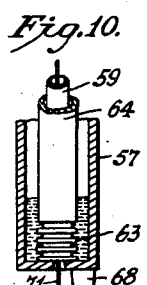
INVENTOR
JAMES R. HICKS
By E. C. Sanborn
ATTORNEY Patented May 18, 1948

2,441,882

UNITED STATES PATENT OFFICE 2,441,882

SEAL FOR DIFFERENTIAL PRESSURE APPARATUS

James R. Hicks, Waterbury, Conn., assignor to The Bristol Company, Waterbury, Conn., a corporation of Connecticut Application April 20, 1943, Serial No. 483,824

21 Claims. (Cl. 73—407)

This invention relates to means for the transmission of limited motion through a rigid wall, and is especially applicable to incorporation in differential pressure apparatus in which an enclosed member, such as a bellows, assumes a position representative of the difference between internal and external fluid pressures applied thereto, and of which position it is required to provide an indication exterior to the body of the instrument.

In devices for measuring the difference of two fluid pressures applied to opposite sides of a manometer element, it is obvious that if both of these pressures be other than atmospheric, both sides must be sealed from the atmosphere. Under this condition there arises the problem of transmitting the motion of the measuring element to outside space where it may be observed and utilized. In the design of differential manometers, especially those adapted for use in the determination of fluid flow, many expedients have been resorted to in order to accomplish this purpose. These include numerous forms of stuffing boxes, magnetic transmission devices, and flexible transmissions which yield in response to the limited motion of the measuring element. Transmissions using stuffing boxes are always more or less subject to leakage and to friction; and any attempt to decrease one of these objectionable features is accompanied by a tendency to increase the other. Magnetic transmissions require that the wall of the containing element have a portion including a considerable area of thin flat non-magnetic material in order that the transmitting magnet and its armature be brought into sufficiently close proximity that the reproduction of readings by the external mechanisms be at all positive. The flexible metallic seals heretofore used have been of such a design that the flexing member is submitted to relatively high stresses, necessitating that a large amount of the power available from the measuring element be utilized in deforming the sealing member, and also requiring that allowance for the elastic properties of said member be incorporated in the calibration of the instrument. Since it is impracticable to design a resilient element which shall combine the desired sealing properties and also have a satisfactorily uniform law of response, such instruments as have heretofore been designed to utilize the principle of the flexible seal are subject to sources of error which seriously detract from the accuracy of measurement.

It is an object of this invention to provide means whereby the motion of a deflected element enclosed in a space out of communication with the atmosphere may be imparted to, or reproduced by, deflecting means exterior to said space and accessible for purposes of observation or control or for direct connection to other mechanisms.

It is a further object to provide for the above purpose means whereby said motion may be imparted without leakage or friction.

It is a further object to provide motion transmitting means of the class set forth, which shall offer a minimum of resistance to the motion of the measuring element.

It is a further object to provide motion transmitting means of the class set forth which shall not interfere with the exact proportionality desired to exist between the deflections of the internal measuring element and the external indicating element.

It is a further object to provide a device of the nature set forth, in which no pivots, knife-edges, or other bearings shall be exposed to fluids other than the atmosphere.

In carrying out the purposes of the invention, it is proposed to provide, in conjunction with a differential pressure-responsive member, a yielding shell adapted to be deflected in response to movement of said member, and a linkage enclosed within said shell and adapted to transmit proportional movement from said member to an element external to the body housing of said member, said shell having its interior in communication with outside space, whereby the elements of mechanism contained therein do not require to be sealed from atmospheric pressure.

In the drawings:

Fig. 1 is a top elevation, partially in section, of a differential pressure measuring instrument embodying the principles of the invention.

Fig. 2 is a front view of the instrument shown in Fig. 1.

Fig. 3 is a rear view, partly in section, of a portion of the mechanism of the instrument shown in Figs. 1 and 2.

Figs. 4, 5, and 6 are rear views, partly in section of alternative forms of the mechanism shown in Fig. 3.

Fig. 7 is an elevation of certain elements which may be substituted for corresponding parts shown in Fig. 1.

Fig. 8 is a front view, partly in section, of an alternative form of instrument embodying the principles of the invention.

Figs. 9 and 10 are sectional views of accessory means which at times may be combined with instruments embodying the invention.

Fig. 11 is a sectional view showing a further alternative form of means which may be employed for transmitting motion to the exterior of the manometer housing.

Referring to the drawings:

The numeral 10 designates a body part forming an enclosed chamber having a main portion 11 and a substantially perpendicularly projecting leg portion 12, each of said portions having a substantially flat end wall with an externally communicating opening therein. Access to the interior of said body part may be provided in any suitable manner, as, for example, by means of a removable cap 11'. Mounted within the main portion 11 of the chamber formed by the body part 10 is a longitudinally deformable bellows member 13 sealed to the interior surface of the end wall of said portion and having its interior in communication with the opening in said wall. Attached to the center of the inner, and free, end of the bellows member 13 is a rod 14 extending within the bellows member and through the opening in the end wall to which the same is attached, and having treadedly mounted thereon two nuts 15 and 16, adapted to engage the outer and inner surfaces respectively of said end wall, and whose positions along the rod 14 can be adjusted to determine the limits of excursion of said bellows member. A removable cap 17, covering the opening in the end-wall of the chamber portion 11 and the exterior end of the shaft 14, normally seals the space within the bellows member 13 from communication with the atmosphere, but, when removed, provides access to the nuts 15 and 16 for adjusting their settings. Enclosed within the bellows member 13 is a compression spring 18 normally tending to maintain said bellows member in an extended condition, with its deflection limited by engagement between the nut 15 and the end wall. A supplementary opening 19 through said wall provides free communication between the interior of the cap 17 and the interior of the bellows member 13, should the nut 15 tend to seal the opening through which passes the rod 14. Passing through the wall of the cap 17 and communicating with the interior thereof and therefore with the interior of the bellows member 13, is a conduit 20 adapted to contain fluid at one of the two pressures whose difference is to be determined.

Sealed to the inner surface of the end wall of the chamber portion 12 is an inwardly perpendicularly projecting rigid tubular structure 25 having, at its outer and inner extremities respectively, bearing elements 26 and 27, through which passes a rotatable shaft 28 adapted for free angular deflection in said bearings. Either or both of bearings 26 and 27 may be of the conventional sleeve type of journal or may be of the ball or roller type, or any other form of substantially frictionless bearing. Fixed to the inner end of the shaft 28 is a small sector 29 having an arcuate surface of cylindrical curvature about the axis of the shaft 28. The tubular bearing member 25 is permanently disposed with respect to the mounting of the bellows 13 and is advantageously located in such a position that the projected center line of said bellows member will pass between the shaft 28 and a tangent to the arcuate surface of the sector 29 drawn parallel to said center line.

Contained within the chamber portion 12 is a movable housing 30 enclosing the tubular structure 25, the shaft 28 and the pulley or sector 29. The housing 30 comprises a flexible portion 31 of corrugated or bellows-like construction (which may expediently be formed of a section of conventional flexible seamless metal hose) surrounding the tubular structure 25 and sealed to the inner surface of the end wall of the chamber portion 12, and a section of metallic tubing 32 having an inside diameter materially greater than the external diameter of the tubular structure 25 surrounding the same for substantially the remaining portion of its inwardly projecting length and terminating in an enlarged cylindrical chamber portion 33, in which lies the pulley or sector 29. The interior of the housing 30, including the chamber portion 33, is sealed from communication with the containing chamber 10; and, as no effort is made to provide fluid-tight joints at the bearings 26 and 27, the inner portion of the housing 30 may be considered as at all times being at atmospheric pressure. The dimensions of the tube 32 and the chamber portion 33 carried thereby are such that the housing may be deflected through a considerable angle (the flexible portion 31 yielding to permit such deflection) without its walls coming in contact with the tubular structure 25 or the sector 29; and, as will be obvious by inspection of Figs. 3, 4, 5, and 6, an offset disposition of the chamber portion 33 with respect to the axis of the tube portion 32, bringing the diameter of the former in line with the axis of the bellows portion 13 and in parallel relation to the tangent to the sector 29 on the side of said diameter remote from the shaft 28, will enable said chamber portion to be constructed more compactly and of smaller dimensions than were it formed coaxial with the shaft 28. In actual practice it has been found expedient to design the mechanism to such relative dimensions that the full range of operation required of the housing is represented by a deflection of approximately 3 angular degrees.

Attached to the center of the inner, or free, end of the bellows member 13 is a link member 35 connecting said bellows member to the wall of the chamber 33, and adapted to transmit longitudinal motion of the bellows member to said chamber portion so that the housing 30 will be rocked through a small angle as the bellows member is more or less deflected. The link member 35 preferably takes the form of a strip of spring material secured to the bellows and the chamber respectively by screws, rivets, soldering, or welding, and, while stiff enough to provide a positive means of transmitting motion between said members, yet possessing sufficient flexibility to allow for the slight angular deflection attendant upon the rocking motion of the element 30 with respect to the bellows member 13. By this type of construction there is eliminated the need for pivots, knife edges, or other types of bearings within the chamber formed by the body portion 10. As shown in Fig. 1, the housing 30 as indicated by full lines is represented in its position corresponding to the extended condition of the bellows member 13 subject to the influence of the spring 18, when in a state of equilibrium corresponding to a zero difference between pressures internal and external to said bellows member. The position of the housing to correspond to the compressed condition of the bellows member as limited by the setting of the nut 16, and slightly exceeding the normal range of deflection, is indicated by the dotted lines designated as 30' in the drawing.

A method by which operative connection may be provided between the walls of the chamber portion 33 and the sector 29 is indicated in Fig. 3. A slender wire or metallic ribbon 36 is attached to the interior wall of the chamber portion 33, and is wrapped about the cylindrical surface of the sector 29 and secured to a radial surface of said sector as by a screw 37. A similar wire or ribbon 38 is wrapped about the cylindrical surface of the sector 29 and secured to a radial surface thereof as by a screw 39, the free end of said wire or ribbon 38 being connected through a light tension spring 40 to the interior wall of the chamber portion 33. The points of attachment of the linkage so formed to the interior walls of the chamber 33 are so chosen that the line of action of the wires or ribbons forms a tangent to the surface of the sector 29, and lies parallel to, but not necessarily in line with, the axis of the bellows portion 13. The wires or ribbons 36 and 38 are slightly displaced axially of the curved surface of the sector 29 so as not to interfere in their operation; and, the spring 40 maintaining the connections between the walls of the chamber portion 33 and the surface of the sector 29 in a state of tension, there is provided a flexible frictionless connection whereby motion of the chamber portion 33 in a sense axial to the bellows member 13, as transmitted by the link 35, will be converted into an angular motion of the sector 29 and the shaft 28 upon which it is mounted. An index or pointer 41 attached to the shaft 28 externally to the body part 10 and cooperating with a stationary graduated scale 42 will provide an indication of the angular position of the shaft 28, and therefore of the deflected position of the free end of the bellows member 13. It will be obvious that, because of the much smaller radius of angular deflection characterizing the sector 29 as compared with the movable housing 30, the linear displacement of the latter, being transmitted by means of the ribbon 36 to the periphery of the former, will cause said sector 29 and the shaft 28 to be rotated through a materially larger angle than that represented by the rocking motion of the housing 30.

Passing through the wall of the body part 10 is a conduit member 44 adapted to contain a fluid, the difference of whose pressure from that in the conduit 20 it is desired to determine. When the pressures in the two conduits 20 and 44 are equal the bellows member 13, under the influence of the spring 18 will rest with the nut 15 near to, but not abutting on, the end wall of the chamber portion 11 and all parts of the associated mechanism in the portions shown in full lines in the drawings. Upon the pressure in the conduit 44 exceeding that in the conduit 20, the former pressure being applied to the interior of the body portion 11 will subject the bellows member 13 to a compressive influence; and upon the excess of said pressure becoming sufficient to overcome the initial influence of the spring 18, the bellows member 13 will be compressed, its free end taking up a position representative of said pressure differential, which position, being transmitted through the mechanism hereinbefore described, will be indicated by the excursion of the pointer 41 with respect to the scale 42.

Upon the differential pressure applied to the bellows member 13 exceeding the normal range of the instrument and attaining such a value that the nut 15 is brought into engagement with the inner surface of the end wall of the chamber portion 11, no further longitudinal deflection of the bellows member 13 will be possible, and further increase of differential pressure will produce no further effect upon the reading of the pointer 41 with respect to the scale 42. Such pressure increases may continue without further response on the part of the instrument until there is attained a pressure differential corresponding to permanent distortion or crushing of the bellows member 13, which value is far in excess of the pressure differentials to which said bellows member is normally responsive. The housing 30 may be designed to withstand relatively high exterior pressures with respect to the atmospheric pressure permanently existing within its walls. The yielding portion 31 is constructed of flexible metallic hose or the like; and such material is available having a degree of flexibility ample for the purposes of the invention, and yet having sufficient compressive strength to resist permanent deformation by such pressures as those to which it may be subjected in the normal use of the instrument. It may here be observed that as the pressure within the body 10 is increased above atmospheric, there will be a component of force, dependent upon the dimensions of the bellows-like section 31, tending to move the housing 30 in a sense to compress said section longitudinally; but tests have shown that the deflection so produced is generally of negligible proportions, so that lateral yield of the link member 35 and of the wires or ribbons 36 and 38 and of the spring 40 will permit such deflection to take place without imposing objectionable stresses upon the linkages or appreciably affecting the relationship between the deflection of the bellows member 13 and of the pointer or index 41. It has been found that forcible longitudinal compression of the material of the flexible section 31 prior to assembly, to an extent that the adjacent convolutions are brought into intimate contact, results in a material reduction in axial deformation under subsequent external fluid pressure and effects this result without appreciably inhibiting the lateral flexibility of the unit through the limited angle of deflection required by the apparatus.

Where conditions are such that the longitudinal deformation of the bellows portion of the housing 30 is sufficient to permit such deflection that the angularity of the connecting linkage between the chamber portion 33 and the sector 29 becomes appreciable, it is possible that the use of the unyielding wire or ribbon 38 in conjunction with the yielding portion of the linkage including the spring member 40, as shown in Fig. 3, may introduce a slight shift in the position relation between said housing and sector portions, with a consequent error in the indication of the instrument. Such a tendency may be eliminated by the construction shown in Fig. 4, where, in addition to the tension spring 40 in the connection between the ribbon 38 and the inner wall of the chamber portion 33, a similar tension spring 45 is interposed between the ribbon 36 and its point of attachment to the interior wall of the chamber portion 30. With this arrangement, extension of the linkage between the chamber and the sector is distributed between the two springs 40 and 45, eliminating any tendency of the sector 29 and the shaft 28 to deflect in an angular sense upon longitudinal displacement of the housing 30.

In Fig. 5 is shown a further alternative form of the mechanism associated with the chamber portion 33. In this form, motion is imparted to the sector 29 by means of wires or ribbons 46 and 47 secured to the sector in the same manner as the corresponding parts hereinbefore described. Instead of the wires or ribbons being attached to diametrically opposed points on the interior surface of the chamber portion 33, said elements are secured to the extremities of a bow 48 enclosed within said chamber portion 33, and attached to its base portion as by screws 49.

A further alternative form of the mechanism for communicating motion from the housing 30 to the shaft 28 is shown in Fig. 6. A gear sector 50 is attached to the shaft 28, and is caused to mesh with a rack element 51 contained by, and constrained to move with, the chamber portion 33. The rack element 51 may be pivotally attached at one end to the interior surface of the chamber 33, as shown in Fig. 6, and be pressed into engagement with the gear sector 50 by means of a leaf spring 52, providing a resilient linkage tending to maintain mesh of the gear surfaces under conditions of vibration or side strain. Where such conditions are not encountered, the rack may be fixedly mounted within the chamber 33, meshing with the gear sector 50, when longitudinal movement of the rack, corresponding to deflection of the housing, will be faithfully reproduced by angular motion of the gear sector 50 and the shaft 28, but motion of the housing 30 in response to variations of the static pressure within the instrument will produce no appreciable deflection of said shaft.

In Fig. 7 is shown an alternative arrangement of the linkage attached to the sector 29, as used in the forms of the invention illustrated in Figs. 3, 4, and 5. This form differs from those previously set forth, only in the application of a pair of parallel wires or ribbons 53, connected to a yoke 54, to replace the single ribbon 38 of the other forms. By this arrangement, with the ribbon 38 passing between the ribbons 53, there is eliminated any tendency for the opposed pull on the ribbons constituting the linkage to develop on the sector 29 a turning moment tending to bend the shaft 28.

In Fig. 8 is shown a form of instrument embodying the principles of the invention, but differing from those hereinbefore set forth to the extent that, whereas in the previously disclosed forms the transmission of motion from the interior to the exterior of the device is effected by angularly rotatable means, said motion is transmitted in the present form by longitudinally displaceable means. A body portion 55, forming a closed chamber, contains a longitudinally deformable bellows member 56 identical in its structure, mounting, and connections with the corresponding member 13 shown in Fig. 1, and is provided with a perpendicularly projecting leg portion 57 having a flat end-wall with a centrally located opening 58 formed therein.

Sealed to the inner surface of the end wall of the leg portion 57 is an inwardly perpendicularly projecting rigid tubular structure 59 having its interior juxtaposed to the opening 58 in the end wall of the leg portion 57, whereby the interior of said tubular structure is in communication with the atmosphere. Said tubular structure 59 extends substantially perpendicularly to the longitudinal axis and line of deformation of the bellows member 56. Carried by the inner end of the tubular structure 59 is a bearing member 60 having journaled therein a right-angled lever or bell crank 61, rotatable through a limited angle about an axis perpendicular to the plane containing the longitudinal axes of said bellows 56 and structure 59. Contained within the leg portion 57 is a movable housing 62 enclosing the tubular structure 59 and the bearing and bell-crank carried thereby. The housing 62 comprises a flexible portion 63 of corrugated or bellows-like construction, surrounding the tubular structure 59 and sealed to the inner surface of the end wall of the leg portion 57, and a section of metallic tubing 64 having an inside diameter materially greater than the external diameter of the tubular structure 59, surrounding said structure for a substantial portion of its inwardly projecting length, and terminating in an enlarged cylindrical chamber portion 65, in which lie the bearing member 60 and the bell-crank 61. The interior of the housing 62 including the chamber portion 65 is sealed from the containing chamber, and, through the interior of the tubular structure 59, is at all times in free communication with the atmosphere. The housing member 62 is similar in all respects to the housing member 30 of the hereinbefore disclosed form of the invention, and may be deflected through a considerable angle without coming in contact with the tubular structure 59 or the parts carried thereby.

Attached to the center of the inner end of the bellows member 56 is a link member 66 connecting said bellows member to the wall of the chamber portion 65, and adapted to transmit longitudinal displacement of the bellows member to said chamber portion so that the housing 62 will be rocked through a small angle as the bellows member is more or less deflected. Interiorly of the chamber portion 65 is a link 67 having one end attached to the inner surface of the wall of said chamber portion at a point adjacent the attachment of the link 66 to the exterior surface of said wall, and having its other end pivotally attached to one arm of the bell-crank 61.

A pedestal 68 fixed to the outer surface of the flat end wall of the leg portion 57 provides a bearing for a shaft or spindle 69 journaled therein and free for angular rotation about an axis parallel to the axis of the bell crank 61. Fixed to the shaft or spindle 69 is a sector 70 having an arcuate surface so disposed that the center line of the tubular structure 59 will be substantially tangent thereto. A flexible link member 71, which may be formed of fine wire or metallic ribbon, is extended between the free arm of the bell-crank 61 and the sector 70, passing through the interior of the tubular structure 59 and the corresponding opening 58 in the wall of the leg portion 57. A spiral spring 72 attached between the spindle 69 and the pedestal 68 serves to exert a slight angular torque upon said spindle, thus maintaining the links 71 and 67 in a state of tension, whereby backlash in the mechanism is eliminated. An index or pointer 73 attached to the spindle 69 and adapted to the deflected tube therewith, is juxtaposed to a graduated scale 74 fixed to the frame of the instrument, and, by the extent of its deflection with respect to said scale, to provide a measure of the longitudinal deflection of the bellows 56, and therefore of the differential of fluid pressures between the interior and the exterior of said bellows member. As shown in the drawing, the bell-crank 61 may, for example, have its horizontal arm double the length of its vertical arm, whereby a 2/1 multiplication will be obtained between the linear deflections of the links 71 and 67 respectively. It will be obvious that these arms may have any desired proportionality, and that if desired, the bell-crank or angular lever may be replaced by its mechanical equivalent, such as a pulley or combination of pulleys.

In the forms of the invention thus far shown, the movable housing element including the flexible bellows portion thereof is exteriorly exposed to the static fluid pressure within the body of the instrument. While as hereinabove pointed out, the flexible bellows portion may readily be provided of such strength as to withstand static fluid pressures within the ranges for which the instrument may be designed, the section of this portion of the structure being formed of relatively thin material renders it important that it be protected from corrosive influences. In Fig. 9 is shown one expedient for this purpose as applied to the form of the invention illustrated in Fig. 1. The tubular section 32 and the flexible metallic bellows section 31 are shown in their normal relation to the chamber portion 12 as hereinbefore fully described. Between the bellows section 31 and the flat end of the chamber portion 12 is provided a ferrule 75 of substantially the same external dimension as the tubular section 32. Surrounding the bellows section 31 and tightly gripping the ferrule 75 and the end of the tubular section 32 adjacent said bellows portion, is a collar formed of a section of resiliently elastic non-metallic tubing 76 composed of rubber or similar material immune to corrosive influences. The collar 76, by its intimate engagement with the ferrule 75 and the tubular section 32 will form an effective seal between the bellows section 31 and the fluid within the body of the instrument, so that, should said fluid be of a corrosive nature, it will not be brought into intimate contact with the relatively delicate wall of the bellows portion. The resilient nature of the material of which the collar 76 is formed will render it sufficiently yielding in its nature so that it will not appreciably inhibit free deflection of the housing with displacement of the measuring element.

Another method whereby the bellows portion of the deflectable housing may be protected from corrosive gases or liquids of low density is applicable in instances where it is found possible to dispose the instrument in such a manner that the perpendicularly projecting leg portion in which the movable housing is located will be in a vertical position with the bellows portion of the housing near its lowest point. In such cases, as shown in Fig. 10, the leg portion may be partially filled with oil or other suitable non-corrosive liquid of higher gravity than the fluid normally in the body of the instrument, which liquid will remain at the bottom of said leg portion, effectually isolating the bellows portion of the device from contact with an injurious, gaseous atmosphere. This expedient is particularly applicable to the form of the invention shown in Fig. 8, wherein the leg portion 57 is normally disposed to be vertically below the body of the instrument.

In the form of the invention illustrated in Fig. 11 the rigid tube carrying an inner support for the motion transmitting shaft, as shown in the previous embodiments of the invention, has been eliminated by the expedient of providing a shaft of sufficient rigidity to resist bending due to cantilever action and to transmit angular motion. A leg portion 80, corresponding to the leg portion 12 shown in Fig. 1, carries an outwardly extending journal 81, which may be of either the sleeve or ball-bearing type, adapted to provide a bearing surface of considerable axial length. Projecting through the journal 81 and extending longitudinally of the leg portion 80 to the interior of the instrument of which said leg portion forms a part, is a shaft or spindle 82 formed of material having a sufficiently large diameter with respect to its length that it may be freely rotated by a turning moment applied to its inner end and without producing appreciable bending action. The shaft 82 may expediently be formed of rigid metal tube. Secured to the inner end of the shaft 82 is a sector 83 similar in construction and function to any one of those shown in Figs. 3, 4, 5, and 6, whereby said shaft may be rotated in response to angular displacement of said sector. Secured to the outer end of the shaft 82 is a pointer 84 whereby may be provided an indication of the angular displacement of said shaft as hereinbefore set forth. Sealed within the leg portion 80 is a metallic bellows portion 85 bearing a rigid tubular portion 86 which surrounds the shaft 82 with a substantial clearance from the same, and terminates in an enlarged chamber portion 87 similar in construction and function to the chamber portion 33 illustrated in Fig. 1.

The operation of the mechanism shown in Fig. 11 is identical with that of the mechanism shown in Fig. 1, but the elimination of the rigid stationary tube 25 such as is shown in Fig. 1, provides a simplification of construction, and also allows for the use of a bellows member 85 and associated tubular portion of smaller diameter, and therefore of thinner wall section than those shown in the previously described embodiments.

The terms and expressions which I have employed are used in a descriptive and not a limiting sense, and I have no intention of excluding such equivalents of the invention described, or of portions thereof, as fall within the purview of the claims.

Having described my invention, what I claim is:

1. In a differential pressure apparatus, a member movable in response to differential pressure, a housing for said member and having an opening in a wall thereof, a yielding shell mounted in said housing and sealed to said wall about said opening to have its interior isolated from space within said housing and exterior to said shell, means connecting said shell and member for transmitting movements of said member to said shell, an element external to said housing, tubular means within said shell and secured to said housing, an element in said tubular means, said element extending through said opening and connected to said external element, and means within said shell for transmitting movement from said shell to the second mentioned element.

2. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, an element external to said housing, tubular means within said shell and secured to said housing, a rotatable shaft in said tubular means, said shaft extending through said opening and connected to said external element, and means within said shell for rotating said shaft in response to movements of said shell.

3. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, an element external to said housing, tubular means within said shell and secured to said housing, a shaft movable longitudinally in said tubular member, said shaft extending through said opening and being connected to said external element, and means within said shell for imparting longitudinal movement to said shaft in response to movements of said shell.

4. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said members to said shell, an element external to said housing, means comprising a rotatable shaft extending from within said shell through said opening to the exterior of said housing for moving said external element, a segment movable with said shaft within said shell, and means operatively connecting said segment and said shell for rotating said shaft in response to movements of said shell.

5. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, an element external to said housing, means comprising a rotatable shaft extending from within said shell through said opening to the exterior of said housing for moving said external element, a segment movable with said shaft within said shell, and means comprising flexible members connecting said shell with said segment for rotating said shaft in response to movements of said shell.

6. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, an element external to said housing, means comprising a rotatable shaft extending from within said shell through said opening to the exterior of said housing for moving said external element, and rack and segment means interposed between said shell and said shaft for rotating the latter in response to movements of said shell.

7. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, an element external to said housing, means comprising a longitudinally movable shaft extending from within said shell through said opening to the exterior of said housing for moving said external element, and means comprising a bell-crank lever interposed between said shell and said shaft for imparting longitudinal movement to the latter in response to movements of said shell.

8. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, an element external to said housing, means comprising a rotatable shaft extending from within said shell through said opening to the exterior of said housing for moving said external element, a segment movable with said shaft within said shell, a flexible element connecting said shell and said segment for rotating said shaft upon movement of said shell in one direction, and a pair of flexible elements connected to said shell and engaging said segment at opposite sides of the first mentioned flexible element for rotating said shaft upon movement of said shell in another direction.

9. In a differential pressure apparatus, a member movable in response to differential pressure, a housing for said member and having an opening in a wall thereof, a shell mounted in said housing and sealed to the wall thereof about said opening to have its interior isolated from space within said housing and exterior to said shell, means connecting said shell and said member for transmitting movements of said member to said shell, said shell having a flexible portion for facilitating movement thereof by said connecting means, means protecting said flexible portion of said shell against corrosive effects of fluid in said housing, an element external to said housing, and means surrounded by said shell and extending through said opening for transmitting movement therefrom to said external element.

10. In a differential pressure apparatus, a member movable in response to differential pressure, a housing for said member and having an opening in a wall thereof, a shell mounted in said housing and sealed to the wall thereof about said opening to have its interior isolated from space within said housing and exterior to said shell, means connecting said shell and said member for transmitting movements of said member to said shell, said shell having a flexible portion for facilitating movement thereof by said connecting means, means comprising a flexible collar surrounding said flexible portion for protecting the latter against corrosive effects of fluid in said housing, an element external to said housing, and means surrounded by said shell and extending through said opening for transmitting movement therefrom to said external element.

11. In a differential pressure apparatus, a member movable in response to differential pressure, a housing for said member and having an opening in a wall thereof, a shell mounted in said housing and sealed to the wall thereof about said opening to have its interior isolated from space within said housing and exterior to said shell, means connecting said shell and said member for transmitting movements of said member to said shell, said shell having a flexible portion for facilitating movement thereof by said connecting means, means comprising a liquid surrounding said flexible portion and of higher specific gravity than fluid elsewhere in said housing for shielding said flexible portion from corrosive effects of said fluid, an element external to said housing, and means surrounded by said shell and extending through said opening for transmitting movement therefrom to said external element.

12. In a differential pressure apparatus, a member movable in response to differential pressure, a housing for said member and having an opening in a wall thereof, a yielding shell mounted in said housing and sealed to the wall thereof about said opening to have its interior isolated from space within said housing and exterior to said shell, means connecting said shell and member for transmitting movements of said member to said shell, a rotatable shaft out of contact with said shell and surrounded only by the same throughout the greater part of the length of said shaft, said shaft extending beyond said shell through said opening to the exterior of said housing, a bearing projecting from said housing for rotatably supporting said shaft, and means within said shell for transmitting motion therefrom to said rotatable shaft.

13. Means for transmitting limited motion through the wall of a vessel adapted to contain corrosive fluid, said means including a movable shell having a flexible portion for facilitating movement thereof, means protecting said flexible portion of said shell against corrosive effects of said fluid, said means comprising a flexible collar surrounding said flexible portion to prevent contact of said fluid with the same.

14. Means for transmitting limited motion through the bottom wall of a vessel adapted to contain a corrosive fluid, said means including a movable shell having a flexible portion for facilitating movement thereof and located adjacent said wall, and a body of liquid of higher specific gravity than fluid elsewhere in said housing immersing said flexible portion to shield the same from corrosive effects of said fluid.

15. In a differential pressure apparatus, an element adapted for linear motion in response to differential pressure, a housing for said element, a shell rockably mounted within said housing for motion with a longitudinal axis thereof in a plane parallel to the line of motion of said element, and having a flexible seal to said housing, the wall of said housing having an opening enclosed by said seal whereby the interior of the shell is in communication with the atmosphere, a rigid mounting within said shell, a member journalled on said mounting for rotary movement through a limited angle about an axis substantially perpendicular to said line of motion and having a portion adapted for motion in an arcuate path tangent to a line parallel to said plane, link means for transmitting motion from said element to said shell, and means for transmitting motion from said shell to said journalled member, a deflectable part exterior to said housing, and an element attached to said member and extending through said opening to transmit motion from said member to said deflectable part.

16. In a differential pressure apparatus, an element adapted for linear motion in response to a differential pressure, a housing for said element, a shell rockably mounted within said housing for motion with a longitudinal axis thereof in a plane parallel to the line of motion of said element, and having a flexible seal to said housing, the wall of said housing having an opening enclosed by said seal whereby the interior of the shell is in communication with the atmosphere, a deflectable part exterior to said housing, mechanical means connected to said deflectable part and extending inwardly into said shell, a member connected to said mechanical means within said shell and mounted for rotary movement through a limited angle about an axis substantially perpendicular to said line of motion of said element, said member having a portion adapted for motion in an arcuate path tangent to a line parallel to said plane, link means for transmitting movement from said element to said shell, and means for transmitting movement from said shell to said member.

17. Means for transmitting motion through a rigid wall separating an interior space and an exterior space subjected to different fluid pressures, comprising an inwardly projecting rigid supporting member fixed to said wall, motion transmitting mechanism movably carried by said supporting member and having a deflectable element extending into said exterior space through an opening in said wall, a housing comprising a flexible mounting portion and carried by said wall, said housing extending into said interior space for limited angular motion therein and forming about said motion-transmitting mechanism and said supporting member an enclosure in communication with said exterior space through said opening, said housing forming a seal between said exterior and interior spaces, means for imparting to said movable housing angular displacement corresponding to motion to be transmitted, said motion-transmitting mechanism including a lever connected to said deflectable element and mounted within said housing for limited deflection about a fixed axis, said lever having a point mechanically connected to a point within said housing and movable therewith, the first named point being displaced from said axis by a radius substantially less than the virtual radius of angular displacement of the second named point in the angular movement of said housing, whereby to impart to said lever angular displacement proportional to, but substantially greater than, that of said housing and to communicate corresponding displacement to said deflectable element.

18. In a differential fluid-pressure apparatus, a deformable hollow element adapted to contain a first pressure fluid and to be deformed by the pressure of the same, a chamber enclosing said element and adapted to contain a second pressure fluid to act upon the exterior of said element whereby the net deformation of the same will be a measure of the difference between said pressures, deflection-measuring means exterior to said chamber, a housing comprising a flexable mounting portion within said chamber, said housing being adapted for limited angular displacement and having its interior in communication with the atmosphere, a lever mounted within said housing for limited deflection about a fixed axis, said lever having a point mechanically connected to a point within said housing and deflectable therewith, the first named point being displaced from said axis by a radius substantially less than the virtual radius of angular displacement of the second named point in the angular movement of said housing, whereby to partake of angular displacement proportional to, but substantially greater than, that of said housing, means for communicating the angular displacement of said lever to said measuring means to be measured thereby, and means within said chamber for imparting movement of said deformable element to said housing.

19. Means for transmitting motion through a rigid wall separating an interior space and an exterior space subjected to different fluid pressures, comprising a rigid supporting member fixed to said wall, motion transmitting mechanism movably carried by said supporting member and comprising lever means and a deflectable element connected thereto, said deflectable element extending from said interior space into said exterior space, through an opening in said wall, a housing comprising a flexible mounting portion carried by said wall, said housing extending into said interior space for limited angular motion within the same and forming about said motion transmitting mechanism and enclosure in communication with said exterior space through said opening, said housing forming a seal between the space within the same and the aforementioned interior space, and said lever means being mounted within said housing for limited deflection about a fixed axis, said lever means having a point mechanically connected to a point within said housing and deflectable therewith, the first named point being displaced from said axis by a radius substantially less than the virtual radius of angular displacement of the second named point in the angular movement of said housing, whereby to partake of angular displacement proportional to, but substantially greater than, that of said housing and to communicate corresponding displacement to said deflectable element.

20. In a differential pressure apparatus, a member movable in response to differential pressure, a housing for said member, a yielding elongated shell mounted in said housing to form a seal around an opening in said housing and being adapted to be deflected through a limited angle in a given plane and about an axis transverse to the length of said shell, means connecting said shell and member for transmitting movements of said member to said shell to deflect the same, an element surrounded by said shell but out of contact with the same and mounted for angular motion in a plane transverse to said first-named plane, means extending from said element beyond the shell through said opening to the exterior of said housing, and means within said shell and articulated thereto for transmitting motion therefrom to said element.

21. In a differential pressure apparatus, a member movable in response to differential pressure, a housing for said member, a shell yieldingly mounted in said housing for limited angular displacement and forming a seal around an opening in said housing, means connecting said member and shell for transmitting movements of said member to said shell, a rotatable shaft surrounded by said shell but out of contact with the same and extending beyond the same through said opening to the exterior of said housing, and a mechanical multiplying linkwork within said shell for transmitting to said rotatable shaft angular displacement substantially greater than that of said shell.

JAMES R. HICKS.

REFERENCES CITED

The following references are of record in the file of this patent:

UNITED STATES PATENTS

| Number | Name | Date |
|---|---|---|
| 1,173,038 | Roschanek | Feb. 22, 1916 |
| 1,827,560 | Binckley | Oct. 13, 1931 |
| 2,184,163 | Barnes | Dec. 19, 1939 |
| 2,260,766 | Bjong | Oct. 28, 1941 |
| 2,298,168 | Robinson | Oct. 6, 1942 |
| 2,299,179 | Rosenberger | Oct. 20, 1942 |

FOREIGN PATENTS

| Number | Country | Date |
|---|---|---|
| 195,229 | Great Britain | Mar. 29, 1923 |
| 343,909 | Great Britain | Feb. 12, 1931 |